(12) United States Patent
Chu et al.

(10) Patent No.: US 7,116,515 B2
(45) Date of Patent: Oct. 3, 2006

(54) METHOD AND APPARATUS FOR COMPENSATING FOR TORQUE CHANGE IN SEEK SERVO

(75) Inventors: Sang-hoon Chu, Seoul (KR); Yong-gwon Lee, Anyang-si (KR); Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/003,029

(22) Filed: Dec. 3, 2004

(65) Prior Publication Data

US 2005/0134997 A1 Jun. 23, 2005

(30) Foreign Application Priority Data

Dec. 5, 2003 (KR) .................. 10-2003-0087940

(51) Int. Cl.
*G11B 5/596* (2006.01)
(52) U.S. Cl. ................... 360/78.07; 360/31
(58) Field of Classification Search ............ None
See application file for complete search history.

(56) References Cited

U.S. PATENT DOCUMENTS

| | | | | |
|---|---|---|---|---|
| 5,305,447 A | * | 4/1994 | Hampshire | 711/112 |
| 5,369,345 A | * | 11/1994 | Phan et al. | 318/561 |
| 5,835,302 A | * | 11/1998 | Funches et al. | 360/78.07 |
| 6,614,617 B1 | * | 9/2003 | Galloway | 360/78.06 |
| 6,751,043 B1 | * | 6/2004 | Magee et al. | 360/77.02 |

FOREIGN PATENT DOCUMENTS

| | | |
|---|---|---|
| JP | 10-188502 | 7/1998 |
| JP | 10-222942 | 8/1998 |
| JP | 2002-050139 | 2/2002 |
| JP | 2002-093080 | 3/2002 |
| JP | 2002-367307 | 12/2002 |

\* cited by examiner

*Primary Examiner*—K. Wong
(74) *Attorney, Agent, or Firm*—Staas & Halsey LLP (57) ABSTRACT

A method and apparatus to compensate for a difference between an actual torque constant and a modeling torque constant used for servo design in a disc drive. The method has operations of: performing predetermined test seeks with respect to test seek positions into which a disc is divided; obtaining torque compensation constants from the test seeks; storing the torque compensation constants in a torque compensation constant table; and compensating for a gain of a seek control loop at a position where a seek is performed in a seek mode, using the torque compensation constants stored in the torque compensation constant table.

23 Claims, 6 Drawing Sheets

METHOD AND APPARATUS FOR COMPENSATING FOR TORQUE CHANGE IN SEEK SERVO

CROSS-REFERENCE TO RELATED APPLICATIONS

This application claims the benefit of Korean Patent Application No. 2003-87940, filed on Dec. 5, 2003, in the Korean Intellectual Property Office, the disclosure of which is incorporated herein by reference.

BACKGROUND OF THE INVENTION

1. Field of the Invention

The present invention relates to a disc drive control method and apparatus, and more particularly, to a method and apparatus to compensate for a difference between an actual torque constant and a modeling torque constant used for servo design in a disc drive.

2. Description of the Related Art

Japanese Patent Publication No. 2002-367307 discloses a device detecting a current and a voltage using a voice coil motor (VCM) current detector and a VCM inter-terminal voltage detector, calculating a coil resistance value and a torque constant, and correcting a seek loop gain based on the coil resistance value and the torque constant.

A data storage device, i.e., a hard disc drive contributes to a computer system operation by reproducing data from a disc using a magnetic head and recording data onto the disc. With high capacity, high density, and a compact structure of a hard disc drive, a bit per inch (BPI) indicating a density in a rotating direction of a disc and a track per inch (TPI) indicating a density in a radial direction thereof have been increased. As a result, a fine mechanism is desired.

A hard disc drive includes a plurality of magnetic transducers that read and/or write information by sensing a magnetic field of one or more rotating discs and/or magnetizing the one or more discs. Information is stored in a plurality of sectors positioned within an annular track. Track numbers are positioned across a surface of a disc. Numbers owned by vertically similar tracks are referred to as cylinder numbers. Accordingly, each track may be defined by a cylinder number.

Each transducer is typically integrated within a slider included in a head gimbal assembly (HGA). The HGA is attached to an actuator arm, which has a voice coil positioned adjacent to a magnetic assembly. The voice coil and the magnetic assembly define a VCM. A hard disc drive typically includes a driving circuit, and a controller to supply current that excites the VCM. The VCM rotates the actuator arm and thus moves transducers across the surface of the disc.

When writing and/or reading information, the hard disc drive may perform a seek routine to move the transducers from one cylinder to another cylinder. During the seek routine, the VCM is excited by current and moves the transducers to a new cylinder position across the surface of the disc. The controller performs a servo routine to guarantee that the transducers are moved to an exact cylinder position and to a center of a given track.

It is preferable to minimize a time required to read information from and/or write information to a disc or discs. Accordingly, the seek routine performed by the hard disc drive should be implemented so that the transducers are moved to the new cylinder position within a short time. In addition, a time to stabilize the HGA should be minimized, so that the transducers quickly write and/or read information and are positioned adjacent to the new cylinder at one time.

Since a torque constant of the VCM of the hard disc drive changes depending upon a state of a head disc assembly and a component characteristic of the VCM, a modeling torque constant determined during servo design may be different from an actual torque constant appearing in the hard disc drive during operation. A big difference between the modeling torque constant and the actual torque constant affects servo performance, and therefore hinders fine seek servo and elongates seek time.

SUMMARY OF THE INVENTION

The present invention provides a method and apparatus to compensate for a torque change in a seek servo, thereby minimizing a difference between a modeling torque constant and an actual torque constant in a disc drive.

According to an aspect of the present invention, there is provided a method of compensating for a torque change in seek servo of a disc drive. The method includes: performing predetermined test seeks with respect to test seek positions into which a disc is divided; obtaining torque compensation constants from the test seeks; storing the torque compensation constants in a torque compensation constant table; and compensating for a gain of a seek control loop at a position where a seek is performed in a seek mode, using the torque compensation constants stored in the torque compensation constant table.

According to another aspect of the present invention, there is provided a method of compensating for a torque change in a seek servo of a disc drive, including performing predetermined test seeks with respect to test seek positions into which a disc is divided and seek directions; obtaining torque compensation constants from the test seeks; storing the torque compensation constants in a torque compensation constant table; and compensating for a gain of a seek control loop at a position where a seek is performed taking into account a seek direction in a seek mode using the torque compensation constants stored in the torque compensation constant table.

According to still another aspect of the present invention, there is provided an apparatus to compensate for a torque change in seek servo of a disc drive. The apparatus includes a seek servo control circuit generating a seek driving current to move a transducer to a target track through a predetermined seek control loop using a predetermined design acceleration trajectory, a predetermined design velocity trajectory, and a predetermined design position trajectory; a memory device storing a torque compensation constant table; a controller performing test seeks with respect to test seek positions into which a disc is divided under predetermined conditions, obtaining torque compensation constants from the test seeks, setting and storing the torque compensation constant table in the memory device, and determining a torque compensation constant according to a position on the disc, in a seek mode, using the torque compensation constant table; and a torque constant compensator compensating for a gain of the seek control loop using the torque compensation constant determined by the controller.

According to yet another aspect of the present invention, there is provided an apparatus to compensate for a torque change in seek servo of a disc drive, including a seek servo control circuit generating a seek driving current to move a transducer to a target track through a predetermined seek control loop using a predetermined design acceleration trajectory, a predetermined design velocity trajectory, and a predetermined design position trajectory; a memory device storing a torque compensation constant table; a controller performing test seeks with respect to test seek positions into which a disc is divided, and seek directions, obtaining torque compensation constants from the test seeks, setting and storing the torque compensation constant table in the memory device, and determining a torque compensation constant according to a position on the disc, taking into account a seek direction, in a seek mode, using the torque compensation constant table; and a torque constant compensator compensating for a gain of the seek control loop using the torque compensation constant determined by the controller.

According to a further aspect of the present invention, there is provided a method of generating torque compensation constants for a disc drive. The method includes performing predetermined test seeks with respect to test seek positions into which a disc is divided and obtaining torque compensation constants from the test seeks by calculating a ratio of an actual seek driving current trajectory to a design acceleration trajectory with respect to the test seek positions.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments described below explain the present invention by referring to the figures.

Figure 1:
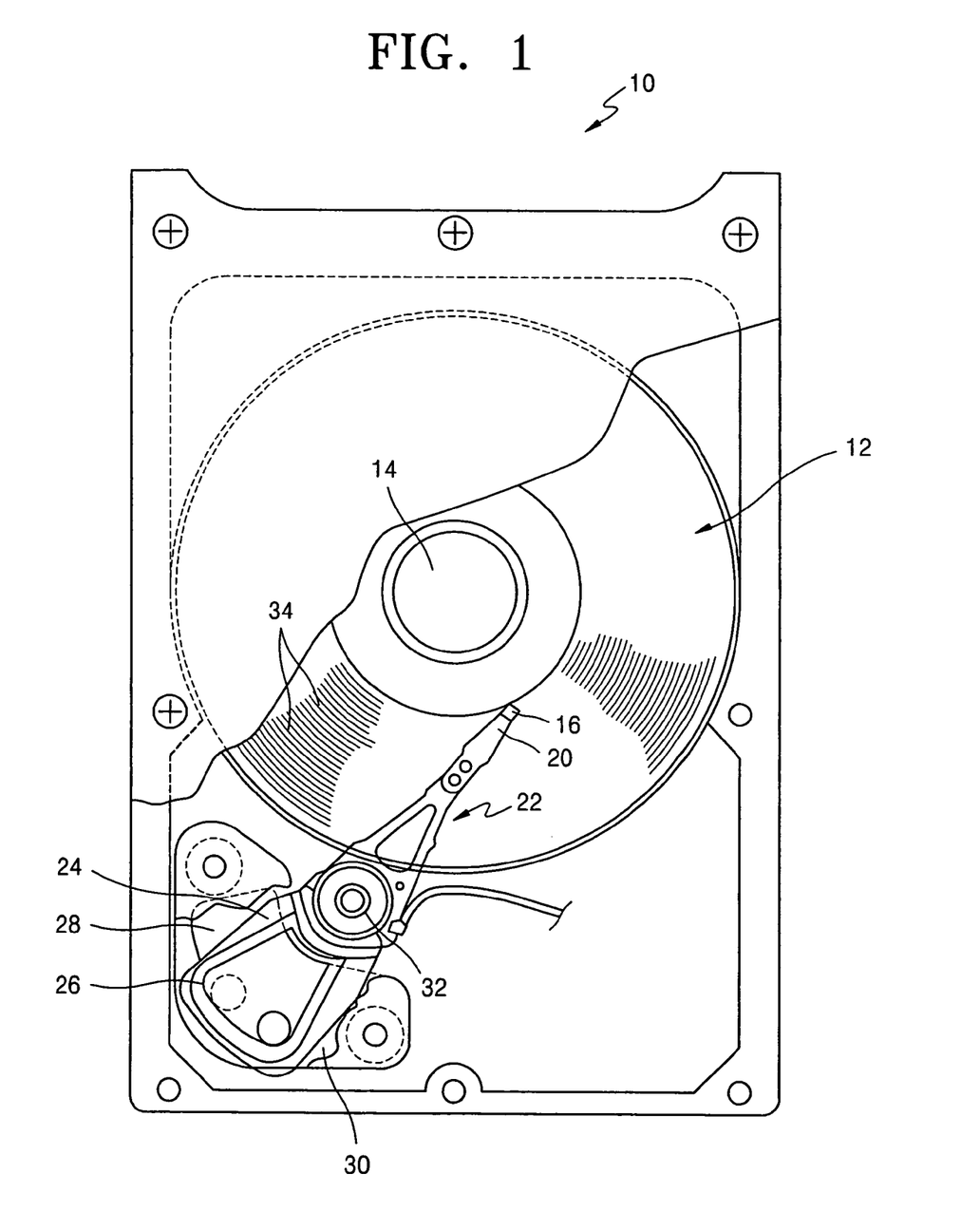
FIG. 1 is a plan view of a hard disc drive using an embodiment of the present invention.

Referring to FIG. 1, a hard disc drive 10 according to an embodiment of the present invention includes at least one magnetic disc 12 rotated by a spindle motor 14, and a transducer 16 positioned in proximity to a surface of the disc 12.

The transducer 16 senses a magnetic field on the disc 12 and magnetizes the disc 12, thereby reading information from and writing information to the rotating disc 12. Although the transducer 16 is shown in a single, the transducer 16 includes a write transducer magnetizing the disc 12 and a read transducer sensing a magnetic field on the disc 12. The read transducer includes a Magneto-Resistive (MR) element.

According to one embodiment, the transducer 16 is integrated into a slider 20. The slider 20 has a structure that generates an air bearing between the transducer 16 and the surface of the disc 12. The slider 20 is incorporated into a head gimbal assembly (HGA) 22. The HGA 22 is attached to an actuator arm 24 having a voice coil 26. The voice coil 26 is positioned in the proximity of a magnetic assembly 28 to define a voice coil motor (VCM) 30. A current supplied to the voice coil 26 generates a torque that rotates the actuator arm 24 with respect to a bearing assembly 32. The rotation of the actuator arm 24 moves the transducer 16 across the surface of the disc 12.

Information is stored in annular tracks 34 of the disc 12. Each track 34 includes a plurality of sectors, each of which includes a data field and an identification field. The identification field contains a gray code to identify a sector and a track (i.e., a cylinder). The transducer 16 is moved across the tracks 34 on the surface of the disc 12 to read information from and/or write information to the tracks 34.

Figure 2:
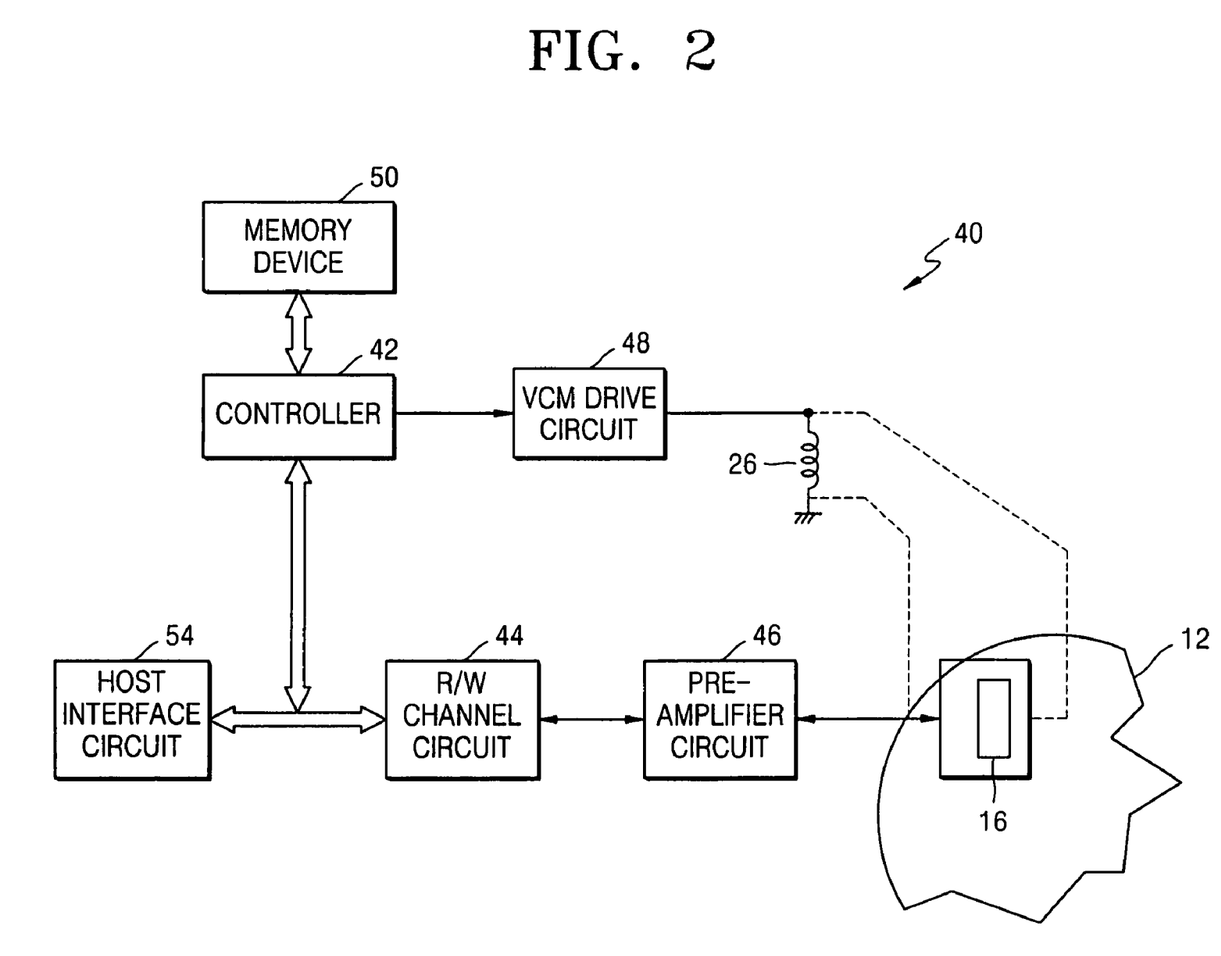
FIG. 2 is a circuit diagram of an electrical system controlling the hard disc drive of FIG. 1.

Operations of an electrical system 40 of the hard disc drive 10 will be described with reference to FIG. 2 below. The electrical system 40 includes a controller 42 connected to the transducer 16 via a read/write (R/W) channel circuit 44 and a pre-amplifier circuit 46. The controller 42 may be a digital signal processor (DSP), a micro processor, or a micro controller and provides a control signal to the R/W channel circuit 44 to read information from and/or write information to the disc 12. Information is transmitted from the R/W channel circuit 44 to a host interface circuit 54. The host interface circuit 54 includes a buffer memory and a control circuit for the hard disc drive 10, to interface with a system such as a personal computer (PC).

The controller 42 is also connected to a VCM drive circuit 48 that supplies a driving current to the voice coil 26. The controller 42 provides a control signal to the VCM drive circuit 48 to control excitation of the VCM 30 and motion of the transducer 16.

The controller 42 includes a buffer memory therewithin, and is connected to a nonvolatile memory device 50 such as a read-only memory (ROM) device or a flash memory device. The memory device 50 stores commands and data that are used by the controller 42 to execute a software routine. The software routine includes a seek routine to move the transducer 16 from one track to another track. The seek routine includes a servo control routine to guarantee that the transducer 16 is moved to an exact track. For example, the memory device 40 stores formulae to generate a sine wave trajectory of acceleration.

Figure 3:
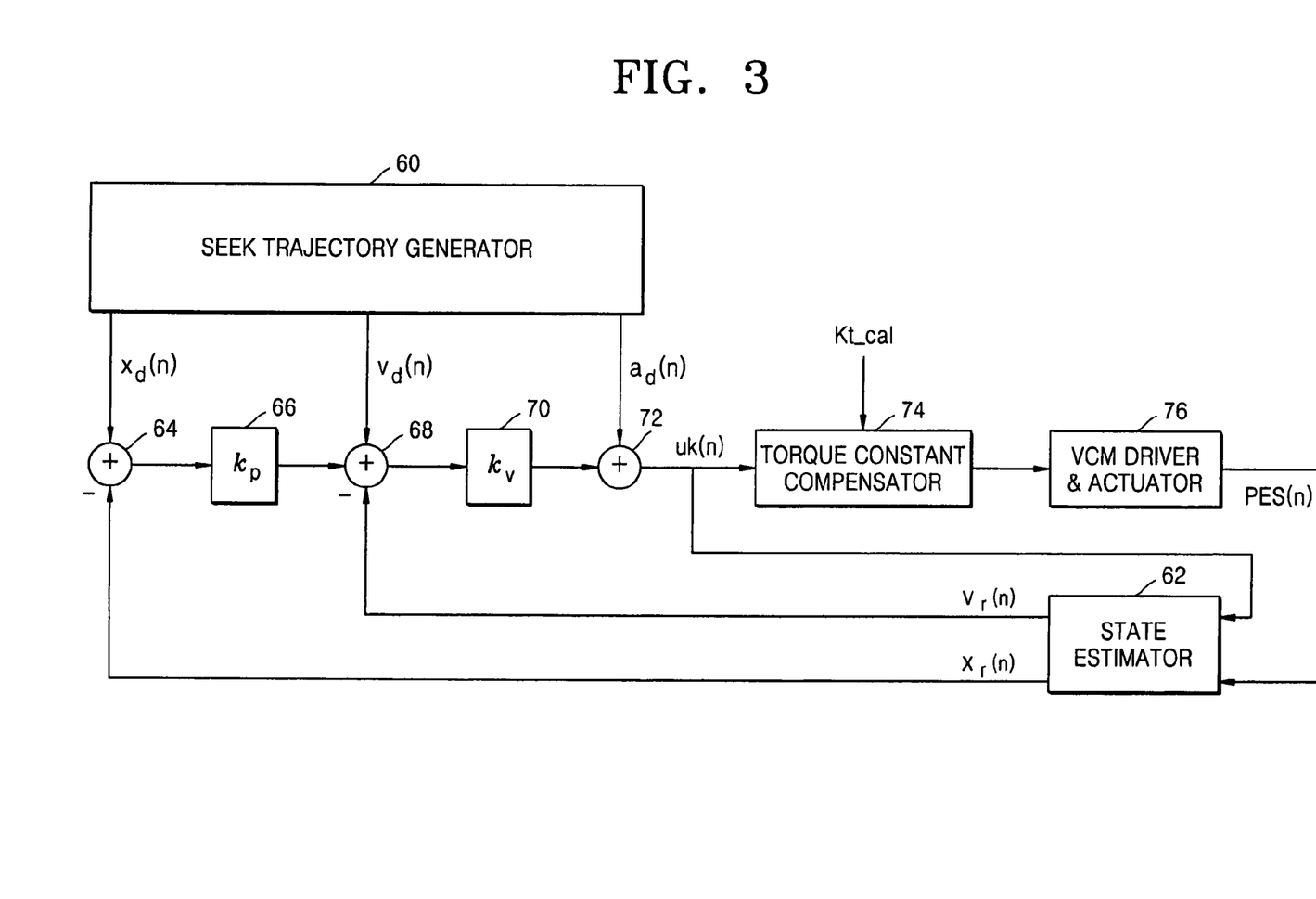
FIG. 3 is a circuit diagram of a servo control system of the hard disc drive of FIG. 1.

FIG. 3 illustrates a track seek servo control system implemented by the controller 42. The track seek servo control system positions the transducer 16 exactly at a target track on the disc 12. The controller 42 executes a seek routine to move the transducer 16 from a current track to a new target track. Gray codes of one or more tracks located between the current track and the target track are read by the transducer 16 that moves across the disc 12. The controller 42 periodically determines, based on the read gray codes, whether the transducer 16 moves across tracks at a target velocity and a target acceleration.

The track seek servo control system includes a state estimator 62 implemented in software and hardware. The state estimator 62 determines an actual distance that the transducer 16 moves from a current track, and an actual position $x_r(n)$ to which the transducer 16 moves from the current track. The actual position $x_r(n)$ is determined by reading a gray code of a track directly below the transducer 16. The state estimator 62 also determines an actual velocity $v_r(n)$. The gray code is periodically sampled when the transducer 16 is moved to a new track, so that the controller 42 controls the transducer 16 accurately.

Whenever the transducer 16 reads a gray code of a track 34, a seek trajectory generator 60 calculates a design position $x_d(n)$, a design velocity $v_d(n)$, and a design acceleration $a_d(n)$ of the transducer 16 using a velocity and a position trajectory that are obtained by integrating a sine wave acceleration trajectory and a velocity trajectory, respectively.

A first summing unit 64 subtracts a value of the actual position $x_r(n)$ from a value of the design position $x_d(n)$. A position control gain compensator 66 multiplies a difference between the actual position $x_r(n)$ and the design position $x_d(n)$, which results from the operation of the first summing unit 64, by a position gain $k_p$ for position compensation, to generate a position compensation value.

Next, a second summing unit 68 adds the position compensation value generated by the position control gain compensator 66 and a value of the design velocity $v_d(n)$, and then subtracts a value of the actual velocity $v_r(n)$. Then, a velocity control gain compensator 70 multiplies a result of the addition and the subtraction by the second summing unit 68 by a velocity gain $k_v$ for velocity compensation, to generate a velocity compensation value.

Next, a third summing unit 72 adds the velocity compensation value and a value of the design acceleration $a_d(n)$ to generate a value of a VCM current uk(n), which is a seek driving current value.

A torque constant compensator 74 multiplies the seek driving current uk(n) value by a torque compensation constant Kt_cal obtained taking into account a torque change in a disc drive, to generate a torque-compensated seek driving current value, and provides the torque-compensated seek driving current value to a VCM driver & actuator 76. Then, the VCM driver & actuator 76 converts the torque-compensated seek driving current value into an analog current signal and provides the analog current signal to a voice coil. Accordingly, a trajectory of a current applied to the voice coil follows a trajectory of an acceleration.

As is described above, since the torque constant compensator 74 outputs a result of multiplying a torque compensation constant, which is determined in accordance with a position with respect to a change torque in a disc drive, by the seek driving current uk(n) value, a gain of a seek control loop varies with the torque compensation constant.

Figure 4:
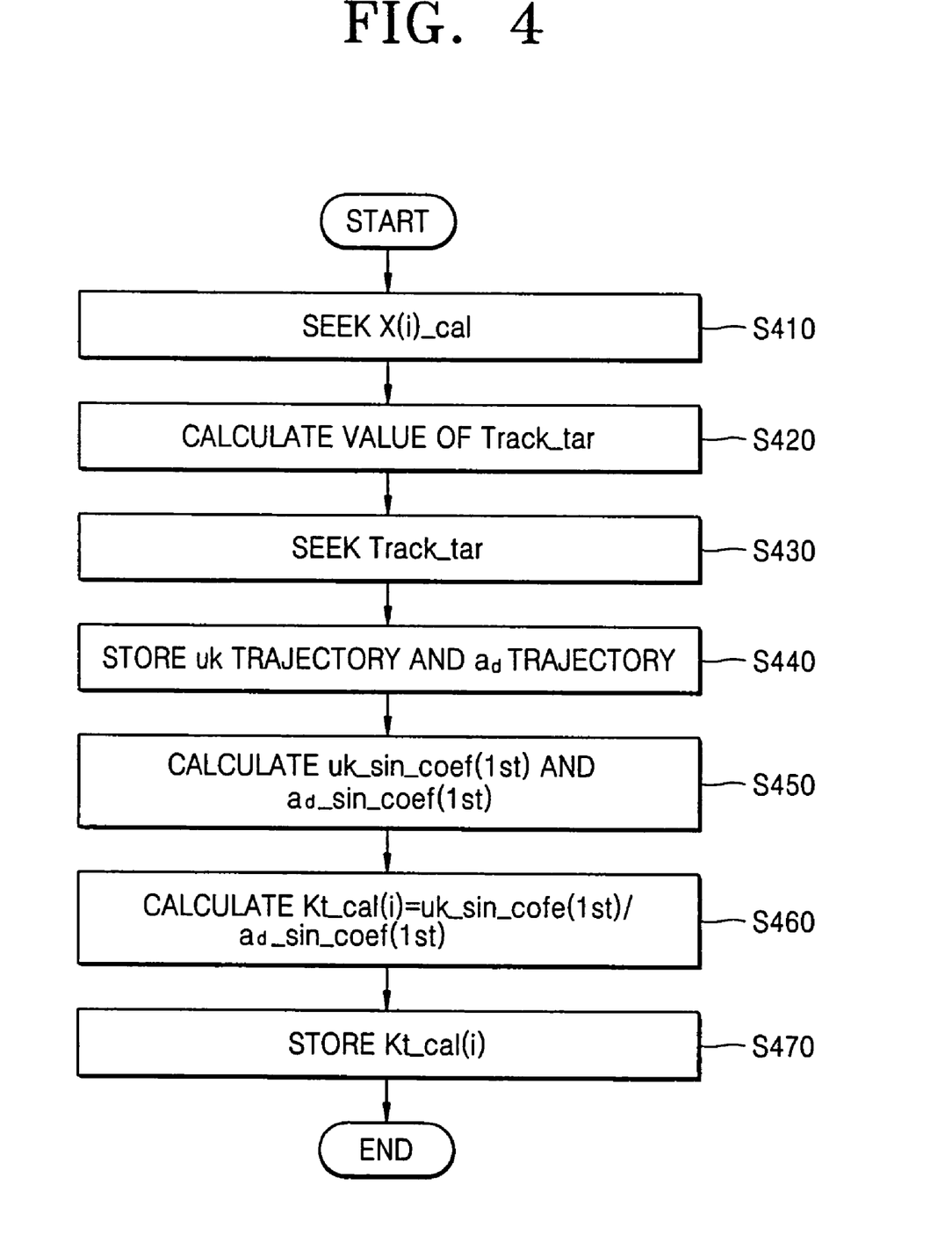
FIG. 4 is a flowchart of a method of generating a torque compensation constant in the disc drive of FIG. 1.

A method of determining the torque compensation constant will be described with reference to FIG. 4. In obtaining the torque compensation constant, a disc is divided into a plurality of regions from an external radius to an internal radius, and as many test seeks as the number of a predetermined number of tracks are performed at a particular position in each region, to increase servo control accuracy.

To obtain a torque compensation constant in a region, a seek for a track position X(i)_cal is performed at a current track in operation S410. A value of the track position X(i)_cal may be set to a predetermined track interval on a disc.

In operation S420, a value of a test target track Track_tar is calculated by adding the value of the particular track position X(i)_cal and a test seek length preset to obtain a torque compensation constant. The test target track Track_tar is sought using the calculated value in operation S430.

Figure 6:
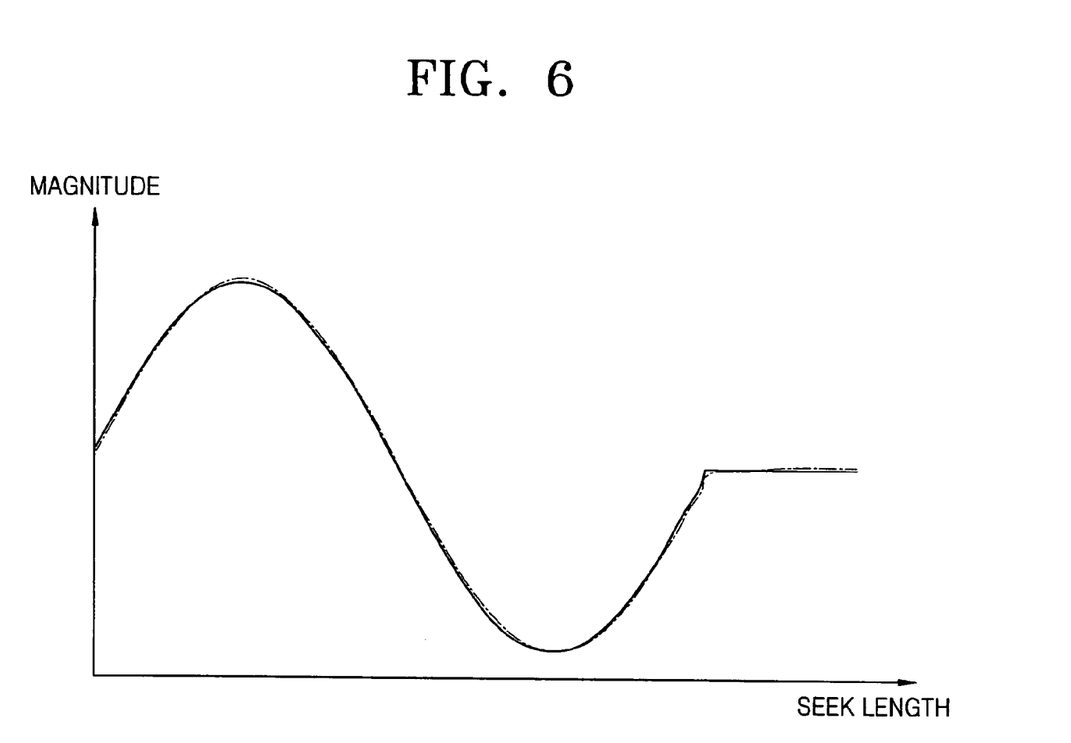
FIG. 6 is a graph showing a trajectory of a design acceleration and a trajectory of an actual seek driving current.

While seeking the test target track Track_tar, a trajectory of the seek driving current uk(n) and a trajectory of the design acceleration $a_d(n)$ are stored in a buffer (not shown) within the controller 42 for each servo sample in operation S440. FIG. 6 illustrates the trajectory of the seek driving current uk(n) and the trajectory of the design acceleration $a_d(n)$. A solid line indicates the trajectory of the design acceleration $a_d(n)$, and a dotted line indicates the trajectory of the seek driving current uk(n).

After completing the seeking of the test target track Track_tar, first harmonic sine coefficients for the respective trajectories of the seek driving current uk(n) and the design acceleration $a_d(n)$ are calculated in operation S450. When a sine wave acceleration trajectory is used, an acceleration trajectory is a pure sine function. Accordingly, if a seek length is set, the seek trajectory generator 60 can calculate a sine coefficient $a_{d\_}$sin_coef(1st) for the trajectory of the design acceleration $a_d(n)$. The first harmonic sine coefficient uk_sin_coef(1st) for the trajectory of the seek driving current uk(n) is calculated using Equation (1).

$$uk\_sin\_coef(1st) = \frac{2}{N}\sum_{n=0}^{N-1} uk(n) \cdot \sin(2\pi f_1 Ts \cdot n) \quad (1)$$

Here, Ts is a sampling time, $f_1$ is a first harmonic frequency, and N is a number of seek driving currents uk(n) stored in the buffer during the seek.

Thereafter, a torque compensation constant Kt_cal at the track position X(i)_cal is calculated using Equation (2) in operation S460.

$$Kt\_cal = \frac{uk\_sin\_coef(1st)}{a_{d\_}sin\_coef(1st)} \quad (2)$$

A torque compensation constant table is set using the track position X(i)_cal in each of the plurality of regions and the torque compensation constant Kt_cal and is stored in the memory device 50 in operation S470.

In an embodiment of the present invention, the torque compensation constant table may be set such that a torque compensation constant varies with a seek position on a disc regardless of a seek direction. But the torque compensation constant may vary with a seek direction at the same position on the disc. To overcome this problem, in another embodiment of the present invention, in a test seek mode, torque compensation constants are calculated using the above-described method while a track number is increased in a direction from an external radius to an internal radius of a disc. In addition, torque compensation constants are calculated while the track number is decreased in a direction from the internal radius to the external radius of the disc. Thereafter, toque compensation constants are stored in the toque compensation constant table together with seek positions and seek directions corresponding thereto.

Figure 5:
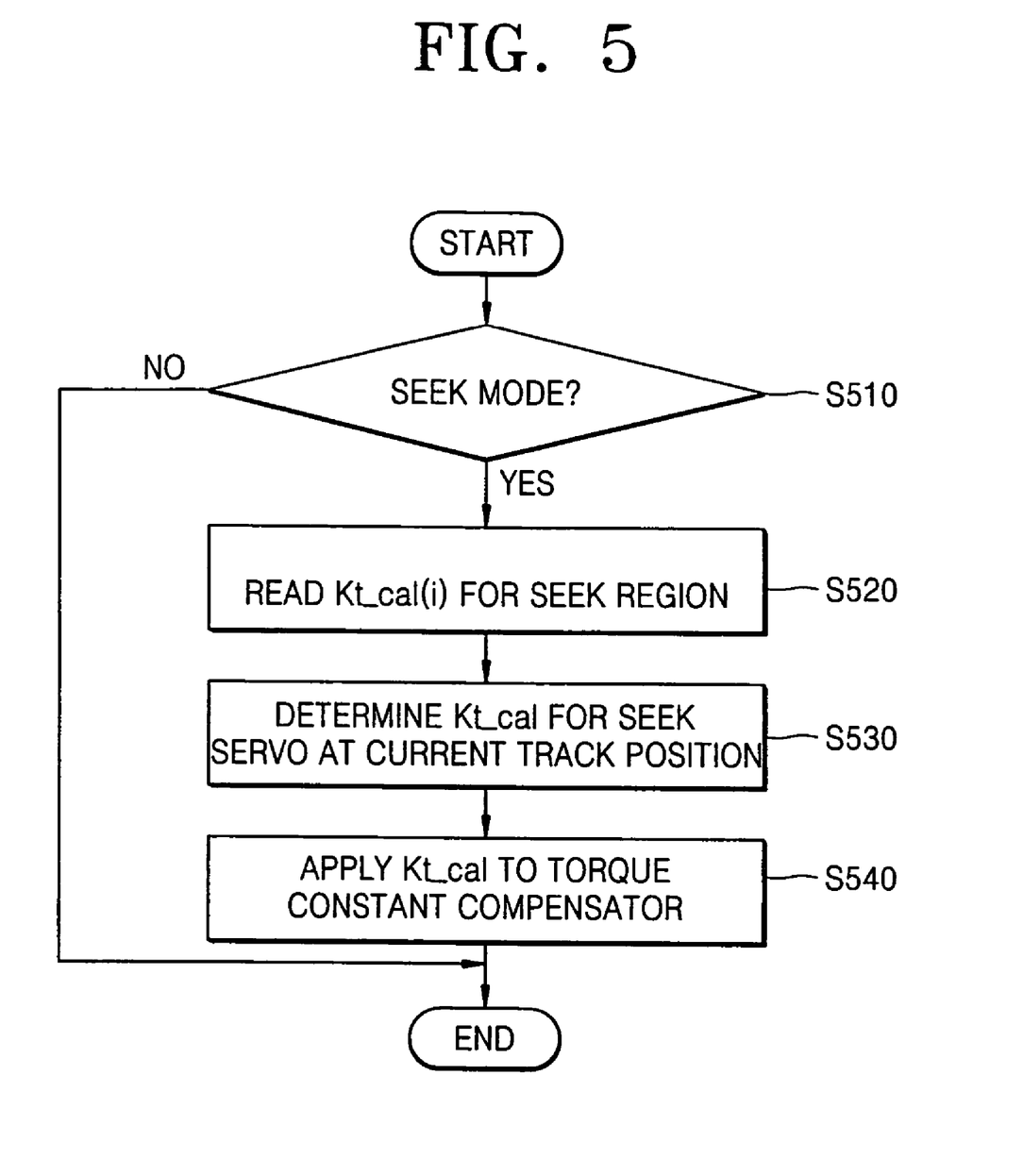
FIG. 5 is a flowchart of a method of compensating for a torque change in a seek servo, according to an embodiment of the present invention.

A method of compensating for a seek loop gain according to a torque change using a torque compensation constant table will be described with reference to FIG. 5. The controller 42 determines whether a seek mode is entered in operation S510.

If it is determined that the seek mode is entered, the controller 42 detects information regarding a track where the transducer 16 is positioned and reads torque compensation constants Kt_cal(i) for a region corresponding to a target track, which is sought at a current track position, from a torque compensation constant table in operation S520. If the torque compensation constant table is set to store torque compensation constants regarding only a seek position without regarding a seek direction, torque compensation constants corresponding to a seek position are read. If the torque compensation constant table is set to store torque compensation constants regarding both of the seek position and the seek direction, torque compensation constants corresponding to a current seek position and a current seek direction are read.

Thereafter, a torque compensation constant Kt_cal for a seek servo at the current track position is determined in operation S530. If a torque compensation constant corresponding the current track position is present, the torque compensation constant corresponding the current track position is selected from the read torque compensation constants. Otherwise, torque compensation constants corresponding to positions adjacent to the current track position are interpolated to obtain a torque compensation constant at the current track position.

Thereafter, in operation S540, the determined torque compensation constant Kt_cal is applied to the torque constant compensator 74 to control a gain of a seek control loop according to the torque compensation constant Kt_cal.

As is described above, to compensate for a difference between a modeling torque constant and an actual torque constant in a seek servo control circuit of a disc drive, a torque compensation constant is calculated with respect to a seek position and/or a seek direction and is reflected to a seek control loop, so that seek control accuracy is increased. As a result, a seek velocity can be increased.

The present invention may be implemented by a method, an apparatus, and a system. When the present invention is implemented in software, the present invention can be embodied as code segments for executing necessary operations. Programs or code segments may be stored in a processor readable medium or may be transmitted through computer data signals mixed with carrier waves in a transmission medium and/or communication network. The processor readable medium is any medium that can store or transmit data. Examples of the processor readable medium include electronic circuits, semiconductor memory devices, ROM, flash memory, erasable ROM, floppy discs, optical discs, hard discs, optical fibre media, and radio frequency (RF) networks. Examples of the computer data signals include any type of signals that can be transmitted through transmission media such as electronic network channels, optical fibre, air, electric fields, and RF networks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of compensating for a torque change in a seek servo of a disc drive, the method comprising:
    performing predetermined test seeks with respect to test seek positions into which a disc is divided;
    obtaining torque compensation constants from the test seeks;
    storing the torque compensation constants in a torque compensation constant table; and
    compensating for a gain of a seek control loop at a position where a seek is performed in a seek mode, using the torque compensation constants stored in the torque compensation constant table,
    wherein the torque compensation constants are obtained by calculating a ratio of an actual seek driving current trajectory to a design acceleration trajectory for each test seek position.

2. The method of claim 1, wherein when a seek control is performed using a sine wave acceleration trajectory, the torque compensation constants are obtained by calculating a ratio of a first harmonic sine coefficient for an actual seek driving current trajectory to a first harmonic sine coefficient for a design acceleration trajectory, with respect to the test seek positions.

3. A method of compensating for a torque change in a seek servo of a disc drive, the method comprising:
    performing predetermined test seeks with respect to test seek positions into which a disc is divided and seek directions;
    obtaining torque compensation constants from the test seeks;
    storing the torque compensation constants in a torque compensation constant table; and
    compensating for a gain of a seek control loop at a position where a seek is performed, taking into account a seek direction in a seek mode, using the torque compensation constants stored in the torque compensation constant table,
    wherein the torque compensation constants are obtained by calculating a ratio of an actual seek driving current trajectory to a design acceleration trajectory for each test seek position.

4. The method of claim 3, wherein when a seek control is performed using a sine wave acceleration trajectory, the torque compensation constants are obtained by calculating a ratio of a first harmonic sine coefficient for an actual seek driving current trajectory to a first harmonic sine coefficient for a design acceleration trajectory, with respect to the test seek positions and seek directions.

5. An apparatus to compensate for a torque change in a seek servo of a disc drive, the apparatus comprising:
    a seek servo control circuit generating a seek driving current to move a transducer to a target track through a predetermined seek control loop using a predetermined design acceleration trajectory, a predetermined design velocity trajectory, and a predetermined design position trajectory;
    a memory device storing a torque compensation constant table;
    a controller
    performing test seeks with respect to test seek positions into which a disc is divided under predetermined conditions,
    obtaining torque compensation constants from the test seeks,
    setting and storing the torque compensation constant table in the memory device, and
    determining a torque compensation constant according to a position on the disc, in a seek mode, using the torque compensation constant table; and
    a torque constant compensator compensating for a gain of the seek control loop using the torque compensation constant determined by the controller,
    wherein the torque compensation constants are obtained by calculating a ratio of an actual seek driving current trajectory to a design acceleration trajectory for each test seek position.

6. The apparatus of claim 5, wherein when a seek control is performed using a sine wave acceleration trajectory, the torque compensation constants are obtained by calculating a ratio of a first harmonic sine coefficient for an actual seek driving current trajectory to a first harmonic sine coefficient for a design acceleration trajectory, with respect to the test seek positions.

7. An apparatus to compensate for a torque change in a seek servo of a disc drive, the apparatus comprising:
a seek servo control circuit generating a seek driving current to move a transducer to a target track through a predetermined seek control loop using a predetermined design acceleration trajectory, a predetermined design velocity trajectory, and a predetermined design position trajectory;
a memory device storing a torque compensation constant table;
a controller
performing test seeks with respect to test seek positions into which a disc is divided, and seek directions,
obtaining torque compensation constants from the test seeks,
setting and storing the torque compensation constant table in the memory device, and
determining a torque compensation constant according to a position on the disc, taking into account a seek direction, in a seek mode, using the torque compensation constant table; and
a torque constant compensator compensating for a gain of the seek control loop using the torque compensation constant determined by the controller,
wherein the torque compensation constants are obtained by calculating a ratio of an actual seek driving current trajectory to a design acceleration trajectory for each test seek position.

8. The apparatus of claim 7, wherein when a seek control is performed using a sine wave acceleration trajectory, the torque compensation constants are obtained by calculating a ratio of a first harmonic sine coefficient for an actual seek driving current trajectory to a first harmonic sine coefficient for a design acceleration trajectory, with respect to the test seek positions and seek directions.

9. A method of generating torque compensation constants for a disc drive, the method comprising:
performing predetermined test seeks, with respect to test seek positions into which a disc is divided; and
obtaining torque compensation constants from the test seeks by calculating a ratio of an actual seek driving current trajectory to a design acceleration trajectory, with respect to the test seek positions
wherein the torque compensation constants are obtained by calculating a ratio of an actual seek driving current trajectory to a design acceleration trajectory for each test seek position.

10. The method of claim 9, wherein when a seek control is performed using a sine wave acceleration trajectory, the torque compensation constants are obtained by calculating a ratio of a first harmonic sine coefficient for the actual seek driving current trajectory to a first harmonic sine coefficient for the design acceleration trajectory, with respect to the test seek positions.

11. A computer program product including a computer readable medium having computer program codes for executing a procedure, comprising:
a first set of instructions to
perform predetermined test seeks with respect to test seek positions into which a disc is divided,
obtain torque compensation constants from the test seeks, and
store the torque compensation constants in a torque compensation constant table; and
a second set of instructions to compensate for a gain of a seek control loop at a position where a seek is performed in a seek mode, using the torque compensation constants stored in the torque compensation constant table,
wherein the torque compensation constants are obtained by calculating a ratio of an actual seek driving current trajectory to a design acceleration trajectory for each test seek position.

12. The computer program product of claim 11, wherein when a seek control is performed using a sine wave acceleration trajectory, the torque compensation constants are obtained by calculating a ratio of a first harmonic sine coefficient for an actual seek driving current trajectory to a first harmonic sine coefficient for a design acceleration trajectory, with respect to the test seek positions.

13. A computer program product including a computer readable medium having computer program codes for executing a procedure, comprising:
a first set of instructions to
perform predetermined test seeks with respect to test seek positions into which a disc is divided and seek directions,
obtain torque compensation constants, and
store the torque compensation constants in a torque compensation constant table; and
a second set of instructions to compensate for a gain of a seek control loop at a position where a seek is performed taking into account a seek direction in a seek mode, using torque compensation constants stored in the torque compensation constant table,
wherein the torque compensation constants are obtained by calculating a ratio of an actual seek driving current trajectory to a design acceleration trajectory for each test seek position.

14. The computer program product of claim 13, wherein when a seek control is performed using a sine wave acceleration trajectory, the torque compensation constants are obtained by calculating a ratio of a first harmonic sine coefficient for an actual seek driving current trajectory to a first harmonic sine coefficient for a design acceleration trajectory, with respect to the test seek positions and seek directions.

15. An apparatus to compensate for a torque change in a seek servo of a disc drive having a disc that is divided into a plurality of tracks and regions, and a transducer to read and/or write data from and/or to the disc, the apparatus comprising:
a controller that:
for each region, performs test seeks moving the transducer from a given region to each track,
determines torque compensation constants from the test seeks using test seek positions,
stores the torque compensation constants in a torque compensation constant table, and
when in a seek mode, selects a torque compensation constant according to a target track, using the torque compensation constant table;
a memory device to store the torque compensation constant table;
a torque constant compensator compensating for a gain of a seek control loop using the torque compensation constant selected by the controller; and
a seek servo control circuit using a predetermined design acceleration trajectory, a predetermined design velocity trajectory, and a predetermined design position trajectory to generate a seek driving current, used in accordance with an output of the torque constant compensator to move the transducer to the target track,
wherein the torque compensation constants are obtained by calculating a ratio of an actual seek driving current trajectory to a design acceleration trajectory for each test seek position.

16. The apparatus according to claim 15, wherein the controller additionally uses seek directions, both to determine the torque compensation constants from the test seeks, and to select the torque compensation constant in the seek mode.

17. The apparatus according to claim 15, wherein the controller is one of a digital signal processor, a micro processor, or a micro controller.

18. The apparatus according to claim 15, further comprising:
a state estimator determining an actual position of the transducer and a actual velocity of the transducer; and
a seek trajectory generator, calculating a design position, a design velocity, and a design acceleration using a velocity and a position trajectory obtained by integrating a sine wave acceleration trajectory and a velocity trajectory, respectively.

19. The apparatus according to claim 18, further comprising:
a first summing unit subtracting the actual position from the design position;
a position control gain compensator multiplying a difference between the actual position and the design by a position gain, to generate a position compensation value;
a second summing unit adding the position compensation value and the design velocity, and subtracting the actual velocity;
a velocity control gain compensator multiplying an output of the second summing unit by a velocity gain, to generate a velocity compensation value; and
a third summing unit adding the velocity compensation value and the design acceleration to generate a value of a seek driving current,
wherein the torque constant compensator multiplies the seek driving current value by the selected torque compensation constant, to generate a torque-compensated seek driving current value.

20. A method to determine a torque compensation constant for a disc drive having a disc that is divided into a plurality of tracks and regions, and a transducer to read and/or write data from and/or to the disc, the method comprising:
determining a value of a given track position;
calculating a value of a test target track position by adding the given track position value to a test seek length;
seeking for the target track;
storing a trajectory of a seek driving current and a trajectory of a design acceleration in a buffer of a controller while seeking for the target track;
calculating first harmonic sine coefficients for the respective trajectories of the seek driving current and the design acceleration;
calculating the torque compensation constant; and
storing the torque compensation constant in a torque compensation constant table.

21. The method according to claim 20, wherein:
the first harmonic sine coefficient for the trajectory of the seek driving current is calculated using the following equation $$\text{uk\_sin\_coef}(1st) = \frac{2}{N}\sum_{n=0}^{N-1} uk(n)\cdot \sin(2\pi f_1 Ts\cdot n),$$

where
uk_sin_coef(1st) is the first harmonic sine coefficient,
Ts is a sampling time,
f1 is a first harmonic frequency, and
N is a number of seek driving currents uk(n) stored in the buffer during the seek; and
the torque compensation constant is calculated using the following equation $$\text{Kt\_cal} = \frac{\text{uk\_sin\_coef}(1st)}{a_d\_\text{sin\_coef}(1st)},$$

where
Kt_cal is the torque compensation constant, and ad_sin_coef(1st) is the first harmonic sine coefficient for the trajectory of the design acceleration.

22. A method of compensating for a seek control loop gain according to a torque change for a disc drive having a disc that is divided into a plurality of tracks and regions, and a transducer to read and/or write data from and/or to the disc, the method comprising:
for each track position, employing the method according to claim 20 to populate the torque compensation constant table;
determining whether a seek mode is entered;
if the seek mode is entered, determining a current position of the transducer and reading torque compensation constants from the torque compensation constant table, for a region corresponding to a target track;
determining a torque compensation constant for a seek servo at the current track position by selecting the torque compensation constant from the torque compensation constant table if a torque compensation constant corresponding the current track position is present in the read torque compensation constants, and otherwise, interpolating torque compensation constants corresponding to positions adjacent to the current track position; and
applying the determined torque compensation constant to a torque constant compensator, to control the gain of the seek control loop.

23. The method according to claim 22, wherein:
if the torque compensation constant table is populated with torque compensation constants determined with regard only to a seek position, without regarding a seek direction, torque compensation constants corresponding to the current seek position are read; and
if the torque compensation constant table is populated with torque compensation constants determined with regard to both the seek position and the seek direction, torque compensation constants corresponding to the current seek position and a current seek direction are read.

* * * * *

UNITED STATES PATENT AND TRADEMARK OFFICE
CERTIFICATE OF CORRECTION

PATENT NO. : 7,116,515 B2  
APPLICATION NO. : 11/003029  
DATED : October 3, 2006  
INVENTOR(S) : Sang-hoon Chu et al.

It is certified that error appears in the above-identified patent and that said Letters Patent is hereby corrected as shown below:

Col. 9, line 47, after "positions" insert --,--

Col. 12, line 11 (approx), change f1 to --$f_1$--

Col. 12, line 24 (approx), change "ad_sin_" to --$a_d$_sin_--

Signed and Sealed this

Twenty-seventh Day of May, 2008

JON W. DUDAS  
*Director of the United States Patent and Trademark Office*